(12) United States Patent
Whitten et al.

(10) Patent No.: US 6,580,992 B2
(45) Date of Patent: Jun. 17, 2003

(54) REAR VIEW MIRROR TILT CONTROL

(75) Inventors: Scott Whitten, East Liberty, OH (US); Hirohide Suda, Dublin, OH (US); Mathew Hargett, Hilliard, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/973,138

(22) Filed: Oct. 9, 2001

(65) Prior Publication Data

US 2002/0052680 A1 May 2, 2002

Related U.S. Application Data

(60) Provisional application No. 60/244,460, filed on Oct. 31, 2000.

(51) Int. Cl.[7] .............................. B60R 1/72; G02B 7/182
(52) U.S. Cl. .......................................... 701/49; 359/877
(58) Field of Search .................... 701/49; 307/10.1; 359/877; 318/466

(56) References Cited

U.S. PATENT DOCUMENTS

| 4,936,671 | A | | 6/1990 | Kaspar |
| 5,315,442 | A | | 5/1994 | Sato et al. |
| 5,624,176 | A | * | 4/1997 | O'Farrell et al. ........... 362/494 |
| 5,796,176 | A | | 8/1998 | Kramer et al. |
| 5,952,802 | A | | 9/1999 | Pimley |
| 5,990,649 | A | * | 11/1999 | Nagao et al. ............ 318/568.1 |
| 6,093,976 | A | | 7/2000 | Kramer et al. |
| 6,094,027 | A | | 7/2000 | Willmore et al. |

FOREIGN PATENT DOCUMENTS

| DE | 3627438 A1 | * | 2/1988 | ........... B60R/16/02 |
| EP | 446095 B | * | 9/1991 | ............. B60R/1/08 |

* cited by examiner

*Primary Examiner*—Michael J. Zanelli
(74) *Attorney, Agent, or Firm*—Rankin, Hill, Porter & Clark LLP

(57) ABSTRACT

A control system for a vehicle passenger side view mirror for tilting the mirror to permit the driver to see the curb upon shifting of the automobile into reverse. When the passenger side mirror is at an extreme inboard or extreme outboard position, and the vehicle is shifted into reverse, the mirror is tilted horizontally to be within predetermined limits, and then is tilted vertically to permit visualization of the ground adjacent the vehicle.

17 Claims, 2 Drawing Sheets

REAR VIEW MIRROR TILT CONTROL

BACKGROUND OF THE INVENTION

1. Field of the Invention

The present invention generally relates to side mirrors for automobiles and, more particularly, to a method for controlling such mirrors.

2. Description of the Related Art

Several automobile side mirror structures and methods of controlling automobile side mirrors are known in the art, as evidenced by U.S. Pat. Nos. 4,936,671; 5,315,442; 5,796,176; 5,952,802; 6,093,976; and 6,094,027, the disclosures of which are expressly incorporated herein by reference in their entireties.

For example, a side mirror control system is known wherein, when the automobile is shifted into reverse gear, the passenger-side mirror is tilted downwardly to permit the driver to see the curb. In this known system, the side mirror is vertically tilted downward a predetermined amount. When the vehicle is shifted out of reverse, the mirror is tilted upwardly the predetermined amount and thereby returns to the original position. The above-mentioned U.S. Pat. No. 4,936,671 is exemplary of the state of the art in this regard. Such known single-axis side mirror tilting control systems ease or facilitate visualizing of the curb during parallel parking of the vehicle.

However, the known control systems suffer from disadvantages that limit their effectiveness in many situations. For example, if the passenger side mirror is in an extreme position, such as full horizontal outboard or full horizontal inboard, when the vehicle is shifted into reverse gear, the known control will attempt to move the mirror downwardly by the predetermined amount. Unfortunately, the desired vertical downward tilting movement of the mirror may be prevented or stopped prematurely due to physical interference between the mirror, the mirror housing and/or the mirror actuator. In this situation, visualization of the curb may be precluded.

SUMMARY OF THE INVENTION

The present invention is directed toward an improved side mirror control system that removes or minimizes the aforementioned deficiencies in the art. The present invention is further directed toward a mirror tilt control system that permits desirable adjustment of the vertical tilt upon shifting into reverse gear, regardless of the initial horizontal tilt position of the mirror. The present invention is also directed toward a mirror tilt control that is better adapted to individual driver's preferences.

In accordance with the present invention, a horizontal tilt position of the passenger side mirror is sensed and, if the horizontal tilt position of the mirror is within predetermined limits, the mirror is moved in accordance with a first routine. If the horizontal tilt position of the passenger side mirror is sensed to be outside of predetermined limits, the mirror is moved in accordance with a second routine.

In further accordance with the present invention, a method for controlling a vehicle rear view mirror to facilitate parking of the vehicle includes the steps of detecting when the vehicle is shifted into reverse, and determining an original tilt position of the rear view mirror. If it is determined that the original tilt position of the rear view mirror is outside of predetermined limits, the mirror is horizontally tilted to bring the mirror to a position within the predetermined limits. The mirror is subsequently tilted downwardly to permit visualization of an area adjacent the vehicle.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
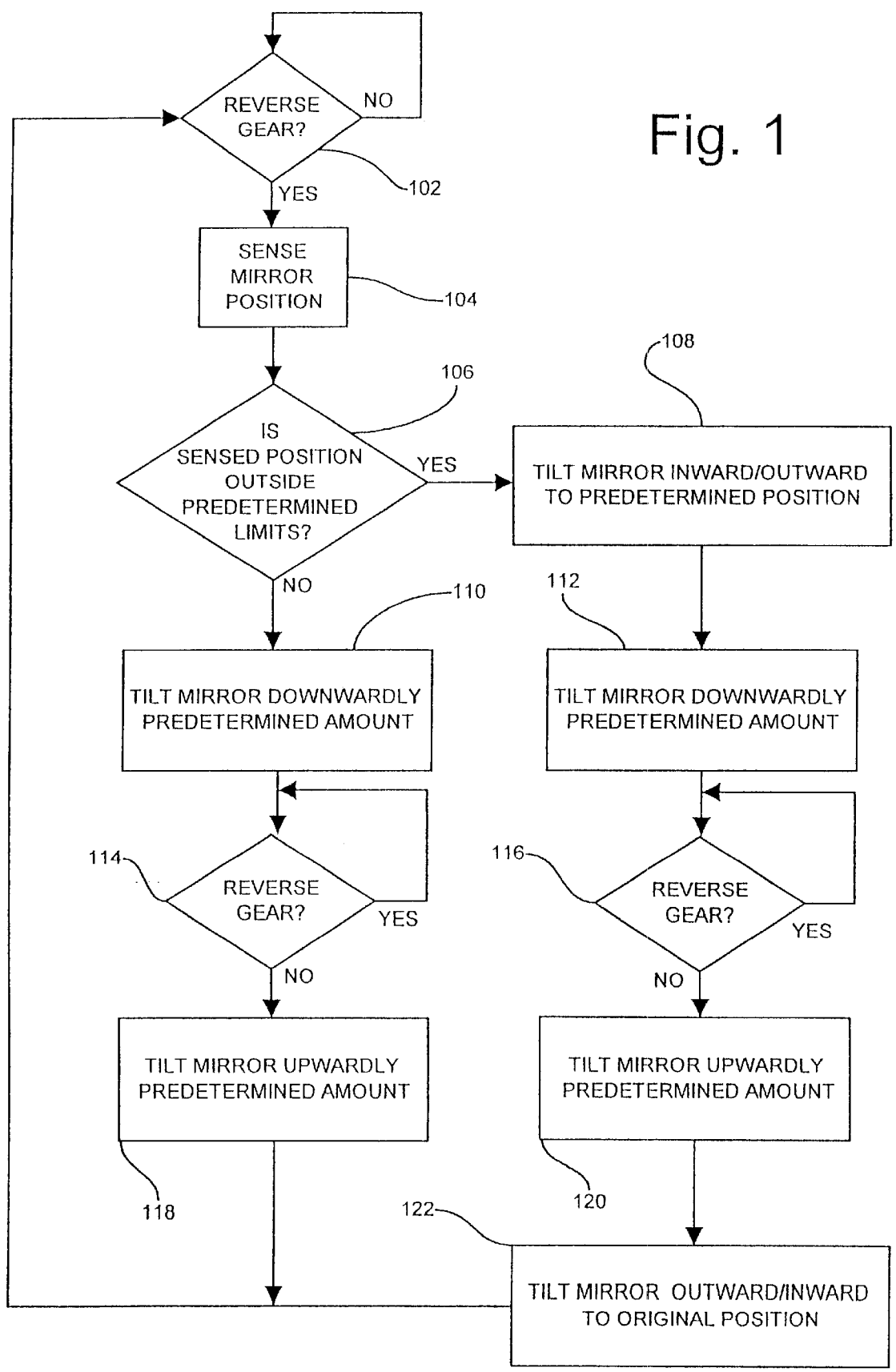
FIG. 1 is a flow chart schematically illustrating the steps of the mirror control system according to the present invention; and, FIG. 2 diagrammatically illustrates the method according to the present invention.

With reference to FIG. 1, a flow chart illustrating a mirror tilt control system according to the present invention is provided. Beginning at step 102, the control system monitors the vehicle to determine whether the vehicle has been shifted into reverse gear. Typically, a switch in the vehicle, hereinafter referred to as a reverse switch, is turned on when the vehicle is in reverse and is turned off when the vehicle is out of reverse. Such a reverse switch is used to activate other equipment in the vehicle, such as the back-up lights, and may be utilized by the present invention to facilitate adjustment of the passenger side mirror, as discussed hereinafter. When the vehicle has been shifted into reverse gear, a position of the passenger side mirror is sensed (step 104). The sensed position is the relative and vertical tilt of the mirror relative to a fixed reference point.

As evidenced by the previously-mentioned patents, which have been incorporated herein by reference, numerous means and devices for sensing mirror position are known to those skilled in the art. It is submitted that these various known means and devices can be interchangeably used in performing the method of the present invention. Accordingly, the present invention is not limited to a particular structure and the specific structural features of the mirror assembly and sensing arrangement will not be described further hereinafter.

If the sensed mirror horizontal tilt position is within predetermined limits (step 106), the control follows a first control routine wherein the mirror is tilted downwardly a predetermined amount (step 110). If the sensed mirror horizontal tilt position is outside predetermined limits (step 106), the control follows a second control routine wherein mirror is first tilted inwardly or outwardly to a predetermined position (step 108), the predetermined position being within the predetermined limits.

As used herein, the term "predetermined limits" is meant to identify a range of horizontal tilt positions between the innermost and outermost horizontal starting tilt positions from which the mirror may be tilted downwardly without engaging the mirror housing or the mirror actuator. It is considered apparent that the "predetermined limits" may be individually determined, preferably by simple experimentation, for each mirror assembly based upon the physical characteristics (spacing, shape, contour, etc.) of the components of the assembly.

As used herein, the "predetermined position" is intended to refer to a tilt position between the aforementioned innermost and outermost horizontal starting tilt positions that define the "predetermined limits". In this regard, it is to be understood that plural predetermined positions may be identified and used instead of a single predetermined position.

For example, the predetermined position may be a position defined as a midpoint between the innermost and outermost horizontal starting tilt positions (i.e., centered within the predetermined limits). Alternatively, a pair of predetermined positions may be utilized such that, when the mirror is initially extremely inboard, the predetermined position will be relatively nearer to the innermost horizontal starting tilt position than to the outermost horizontal starting tilt position. Likewise, when the mirror is initially extremely outboard, the predetermined position will be nearer to the outermost horizontal starting tilt position than to the innermost horizontal starting tilt position. Use of plural predetermined positions may facilitate viewing of the curb for the user as they are closer to the original tilt setting of the mirror than a completely neutral or midpoint position, which would result from use of a single predetermined position.

With continuing reference to FIG. 1, after the mirror is tilted downwardly a predetermined amount (step 110), the condition of the transmission or reverse switch is monitored (step 114). When the control system determines that vehicle is shifted out of reverse (i.e., into park, neutral, or a forward gear) the mirror is tilted upwardly the predetermined amount (step 118) to return the mirror to the original position. Thereafter, the system continues to monitor to determine whether the vehicle is shifted into reverse gear (step 102).

In this regard, it is noted that sequence of the monitoring (step 114) and the mirror tilting upwardly (step 118) may be modified. For example, a time delay may be inserted between the instance that the vehicle is shifted out of reverse (step 114) and the time that the mirror is tilted upwardly (step 118). Such time delay will permit the driver to move the vehicle forward and backward to park the vehicle without having the mirror oscillate between the original and curb-facing directions. As another alternative, the mirror may remain in the curb-facing direction until the vehicle is put in park or until the time delay has passed, whichever comes first. Placing of the vehicle in park is indicative of the end of the parallel parking procedure and that the driver is no longer interested in visualizing the curb. Therefore, returning the mirror to the original tilt position following the time delay (after the vehicle is in a forward gear) or when the vehicle is in park is appropriate.

With continued reference to FIG. 1, if the mirror tilt position is sensed to be outside the predetermined limits in step 106, the mirror is tilted horizontally inwardly or outwardly to a predetermined position. As noted hereinbefore, the term predetermined position does not necessarily limit the invention to a single position, but rather is intended to define a position disposed within the predetermined limits.

After the mirror reaches the predetermined position, the mirror is tilted downwardly a predetermined amount (step 112) to permit the driver to see the curb, thereby facilitating parallel parking of the vehicle. The predetermined amount of downward tilt may the be same as that of step 110, discussed hereinbefore, or may be different. The vehicle is monitored for shifting out of reverse gear (step 116).

When it is determined that the vehicle is shifted out of reverse gear, the mirror is tilted upwardly the predetermined amount (step 120), thereby reversing the action of step 112 and returning the mirror to the predetermined position. The mirror is then tilted horizontally outwardly or inwardly (step 122) to return the mirror to the original tilt position. Thereafter, the system monitors for shifting into reverse gear (step 102).

As noted hereinbefore, the sequence or timing of transmission gear monitoring (step 116), upwardly-tilting the mirror a predetermined amount (step 120), and outwardly/inwardly tilting the mirror to the original tilt position (Step 122) may be modified. For example, a time delay may be inserted between the time that the vehicle is shifted out of reverse (step 116) and the time that the mirror is tilted upwardly (step 120). This will delay return of the mirror to the original position for an extended period of time. Such time delay will permit the driver to move the vehicle forward and backward to park the vehicle without having the mirror oscillate between the original and curb-facing directions. As another alternative, the mirror may remain in the curb-facing direction until the vehicle is placed into park or until the time delay has passed, whichever comes first.

Figure 2:
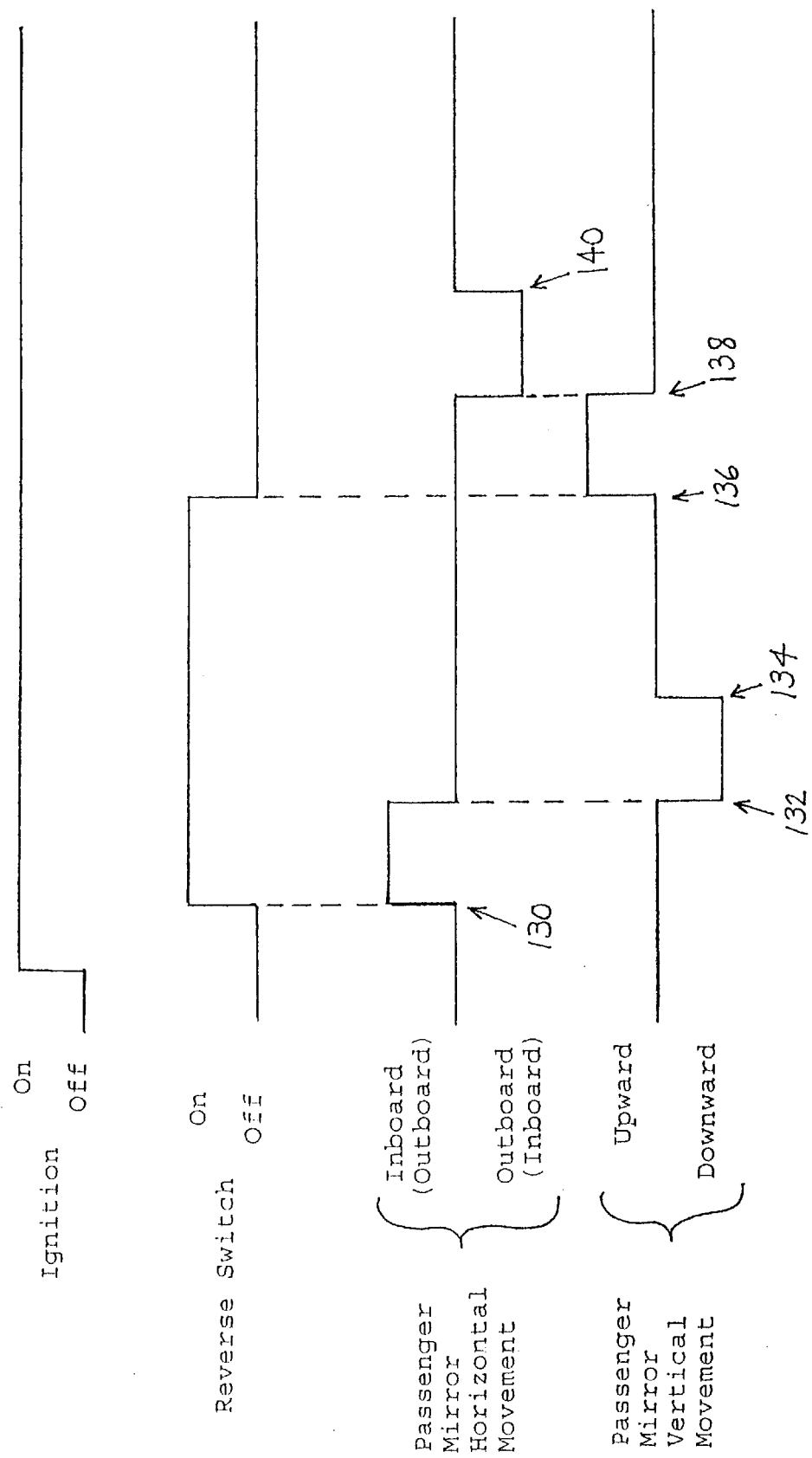

With reference to FIG. 2, the status of the ignition, transmission, and passenger side mirror during the various operational conditions, described above with regard to FIG. 1, is schematically illustrated. The drawing of FIG. 2 illustrates the operation of the control system of the present invention when the passenger side mirror original tilt position is outside the predetermined limits. Moreover, FIG. 2 illustrates that shifting of the vehicle into reverse gear causes the control system to sequentially rotate the mirror about a first axis, for horizontal pivoting of the mirror, and then about a second axis, for vertical pivoting of the mirror. The drawing further illustrates the sequential reverse or opposite movement of the mirror upon shifting of the vehicle out of reverse.

When the ignition is on and the vehicle is shifted into reverse, such that the reverse switch is turned on (130), the passenger side mirror is tilted horizontally inboard (outboard) toward the predetermined position. When the passenger side mirror reaches the predetermined position (132), horizontal tilting movement ends and vertical downward tilting movement begins. The vertical downward tilting movement continues until the mirror has been tilted downward the predetermined amount, at which point downward tilting ends (134).

Thereafter, the system waits for the vehicle to be shifted out of reverse, i.e., for the reverse switch to be off (136), at which point the passenger side mirror is tilted vertically upward toward the predetermined position. When the predetermined position is reached (138), vertical tilting ends and horizontal tilting of the mirror begins to return the mirror to the original tilt position. When the original position is reached (140), the routine is completed, and the system waits for the vehicle to be shifted into reverse.

While the preferred embodiment of the present invention is shown and described herein, it is to be understood that the same is not so limited but shall cover and include any and all modifications thereof which fall within the purview of the invention. For example, although the invention described herein provides for horizontal and vertical tilting to be accomplished sequentially, it is considered apparent that the system could be modified to provide for compound or concurrent horizontal and vertical motion to speed arrival at the desired position.

What is claimed is:

1. A method for controlling a rear view mirror on a vehicle to facilitate parking of said vehicle, comprising the steps of:

detecting when the vehicle is shifted into reverse;

determining an original tilt position of the rear view mirror;

determining whether said original tilt position is outside of predetermined limits and, if said rear view mirror original tilt position is outside said predetermined limits, performing the following steps:

horizontally tilting said mirror to a position within said predetermined limits; and, vertically tilting said mirror to permit a driver to view a ground surface adjacent the vehicle.

2. The method according to claim 1, wherein, during said step of horizontally tilting said mirror, the mirror is moved to a predetermined position.

3. The method according to claim 2, wherein the mirror is moved a predetermined amount during said vertical tilting step.

4. The method according to claim 1, wherein the mirror is moved a predetermined amount during said vertical tilting step.

5. The method according to claim 1, wherein, after said vertically tilting step, comprising the further steps of:

detecting when said vehicle is shifted out of reverse;

vertically tilting said mirror back to said position; and, horizontally tilting said mirror back to said original tilt position.

6. The method according to claim 5, wherein, during said step of horizontally tilting said mirror, the mirror is moved to a predetermined position.

7. The method according to claim 6, wherein the mirror is moved a predetermined amount during said vertical tilting step.

8. The method according to claim 5, wherein the mirror is moved a predetermined amount during said vertical tilting step.

9. The method according to claim 6, wherein, after said vertically tilting step, comprising the further steps of:

detecting when said vehicle is shifted out of reverse;

monitoring said vehicle and waiting a predetermined time period and, if said vehicle remains out of reverse gear for said predetermined time period, performing the steps of:

vertically tilting said mirror back to said position; and, horizontally tilting said mirror back to said original tilt position.

10. The method according to claim 9, wherein, during said step of horizontally tilting said mirror, the mirror is moved to a predetermined position.

11. The method according to claim 10, wherein the mirror is moved a predetermined amount during said vertical tilting step.

12. The method according to claim 9, wherein the mirror is moved a predetermined amount during said vertical tilting step.

13. A method for controlling a rear view mirror on a vehicle to facilitate parking of the vehicle, comprising the steps of:

detecting when the vehicle is shifted into reverse;

determining an original tilt position of the rear view mirror;

determining whether said original tilt position is outside of predetermined limits;

if said original tilt position is within said predetermined limits, vertically downwardly tilting said mirror a predetermined amount to permit the driver to view a ground surface adjacent the vehicle; and, if said rear view mirror original tilt position is outside said predetermined limits, performing the following steps:

horizontally tilting said mirror to an intermediate position within said predetermined limits; and, vertically downwardly tilting said mirror to permit the driver to view a ground surface adjacent the vehicle.

14. The method according to claim 13, wherein when said original tilt position is outside said predetermined limits and after said vertically downwardly tilting step, comprising the further steps of:

detecting when said vehicle is shifted out of reverse;

vertically tilting said mirror back to said intermediate position; and, horizontally tilting said mirror back to said original tilt position.

15. The method according to claim 14, wherein, during said step of horizontally tilting said mirror, the mirror is moved to a predetermined position.

16. The method according to claim 14, wherein the mirror is moved a predetermined amount during said vertical tilting steps.

17. The method according to claim 13, wherein said original tilt position was outside said predetermined limits and wherein the mirror is moved a predetermined amount during said vertical tilting step.

* * * * *

UNITED STATES PATENT AND TRADEMARK OFFICE
CERTIFICATE OF CORRECTION

PATENT NO.      : 6,580,992 B2
DATED           : June 17, 2003
INVENTOR(S)     : Whitten et al.

It is certified that error appears in the above-identified patent and that said Letters Patent is hereby corrected as shown below:

Column 2,
Line 30, after "relative" insert -- horizontal --.

Column 5,
Line 29, delete "claim 6" and insert -- claim 1 --.

Signed and Sealed this

Thirtieth Day of September, 2003

JAMES E. ROGAN
*Director of the United States Patent and Trademark Office*